United States Patent [19]

Egelhof et al.

[11] 4,351,728
[45] Sep. 28, 1982

[54] SEPARATOR FOR CLEANING SUSPENSIONS

[75] Inventors: Dieter Egelhof; Hans R. Schmid, both of Heidenheim, Fed. Rep. of Germany

[73] Assignee: J. M. Voith GmbH, Heidenheim, Fed. Rep. of Germany

[21] Appl. No.: 171,665

[22] Filed: Jul. 24, 1980

[30] Foreign Application Priority Data

Jul. 27, 1979 [DE] Fed. Rep. of Germany ....... 2930475

[51] Int. Cl.³ .......................... B01D 29/42; B07B 1/20
[52] U.S. Cl. ...................................... 210/415; 162/55; 209/273; 210/456
[58] Field of Search .................. 162/55, 343; 209/273, 209/297, 306; 210/413–415, 456

[56] References Cited

U.S. PATENT DOCUMENTS

| 1,921,750 | 8/1933 | Heinrich et al. | 209/273 |
| 3,400,820 | 9/1968 | Nelson | 209/273 |
| 3,680,696 | 8/1972 | Morin | 210/415 X |
| 3,726,401 | 4/1973 | Bolton et al. | 210/415 X |
| 4,188,286 | 2/1980 | Holz | 210/415 X |

FOREIGN PATENT DOCUMENTS

| 2014700 | 6/1971 | Fed. Rep. of Germany . | |
| 2548578 | 12/1977 | Fed. Rep. of Germany | 209/273 |
| 2384889 | 11/1978 | France | 209/306 |
| 636313 | 12/1978 | U.S.S.R. | 162/55 |

Primary Examiner—Robert H. Spitzer
Attorney, Agent, or Firm—Albert L. Jeffers; Roger M. Rickert

[57] ABSTRACT

A seperator, for example, for use in paper production, of the kind having a rotationally symmetrical strainer through which the suspension flows, enclosed in a housing which has an inlet for the suspension to be cleaned and outlets both for cleaned suspension and for impurities held back by the strainer, and having blades revolving in front of the strainer which are divided into part-blades along the axis of rotation, that is, by planes perpendicular to the axis of rotation, and are offset relative to each other in the circumferential direction is disclosed. Several rows of part-blades are arranged over the strainer basket, these part-blades being of such a length and staggered over the circumference in such a way that substantially at every height level, relative to the height of the strainer basket, part-blades from several rows pass by the strainer basket. A separator free of troublesome pressure pulsations is thereby provided.

8 Claims, 2 Drawing Figures

SEPARATOR FOR CLEANING SUSPENSIONS

BACKGROUND OF THE INVENTION

The invention relates to a separator for cleaning suspensions, particularly fiber suspensions, of the kind having a rotationally symmetrical strainer through which the suspension flows, and with a housing enclosing the strainer, this housing having an inlet for the suspension to be cleaned and outlets both for the cleaned suspension and for the impurities held back by the strainer, and with blades revolving in front of the strainer which are divided into part-blades along the axis of rotation and are offset relative to each other in the circumferential direction.

A separator of this kind is described in German Patent Specification No. 20 14 700. It is the purpose of the blade arrangement of the present invention to reduce the pulsating pressure shocks which it produces and which extend out to the pulp outlet and result in problems there during sheet formation.

The production of paper is carried out at ever increasing speeds and the demands made on the quality of the papers are becoming ever greater. For this reason, the measures described in said German Patent Specification are not always sufficient.

SUMMARY OF THE INVENTION

An object of the present invention is to produce a separator of the kind described above, in which the pressure pulsations caused by the blades are suppressed more strongly and in which no troublesome pressure pulsations occur even at high rotary speeds.

According to the invention in a separator of the kind described above several rows of part-blades are arranged over the strainer basket, these part-blades being of such a length and staggered over the circumference in such a way that substantially at every height level, relative to the height of the strainer basket, part-blades from several rows pass by the strainer basket.

Due to the fact that many small blades are used on several height planes, no more troublesome pressure pulsations occur. The blade lengths are chosen so that an adequate separating effect is obtained. Compared with the state of the art, due to the "overlapped" arrangement according to the invention, more part-blades are possible over a specific area. Furthermore, due to the fact that the individual rows are arranged offset from each other, no periodic pressure shocks can spread out.

As a further development of the invention, provision is made for shorter blades to be arranged between the blades of normal length in front of the strainer, at the circumference, in the vicinity of the outlet for the cleaned suspension.

It has been established that the outlet zone is frequently responsible for the creation of the pressure pulsations. The pulsations continue on, in fact, through this outlet. According to the invention measures are now taken to ensure that there is a higher number of blades in this region, and when a progressive pattern is used relative to the blade arrangement, the blade pattern is the same all over. At the lower end of the strainer basket the blades are virtually cut away.

This measure can also be advantageous in the inlet region.

It is also advantageous if the part-blades are arranged in such a way that in addition substantially the same number of blades passes by the strainer basket at each height level.

This measure enables the same cleaning effect to be obtained everywhere.

As development of the invention, provision is made for the part-blades to be arranged with spacers on a rotating drum.

BRIEF DESCRIPTION OF THE DRAWING

In order that the basic principles and further features of the invention will be readily understood, one embodiment of separator in accordance therewith will now be described with reference to the accompanying drawing, in which.

DESCRIPTION OF THE PREFERRED EMBODIMENT

Figure 1:
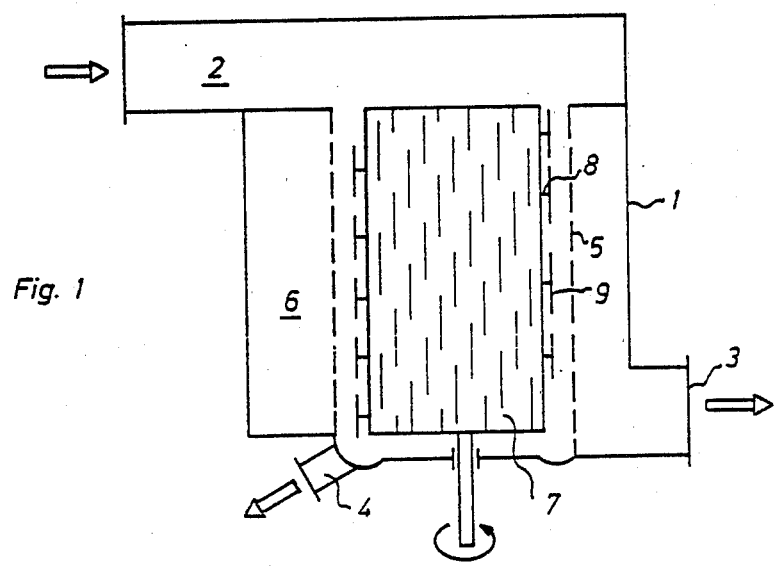
FIG. 1 is a longitudinal section through a separator.

The separator, which is constructed as a vertical separator, has, as illustrated in FIG. 1, a housing 1 with an inlet connection 2 for the suspension which is to be cleaned and an outlet connection 3 for the cleaned suspension, as well as an outlet pipe 4 for the impurities. Inside the container there is a stationary strainer basket 5, behind which an annular gap 6 for accommodating the cleaned suspension is located, from whence the latter is removed via the outlet 3.

Inside the strainer basket 5 there is a rotating drum 7 to which a plurality of part-blades 9 is attached, via spacers 8.

The part-blades 9 are arranged in several sequent rows and are offset from each other. Preferably at least eight rows are used. The separate rows are arranged offset from each other. The part-blades 9 are only shown basically and incompletely in FIG. 1, for reasons of clarity.

For the prevention of pulsations it has proved advantageous if:

$$0.4 > a > 0.25$$

where $a = x/t_u$ $t_u$ = the distance between the blades in a horizontal row $x$ = the horizontal distance between two vicinal or adjacent blades of two sequent rows.

It is also advantageous is:

$$Z \times h = (4 \text{ to } 8) \times H$$

where
Z = the number of blades
H = the height of the strainer basket
h = the height of the full size blades.

Figure 2:
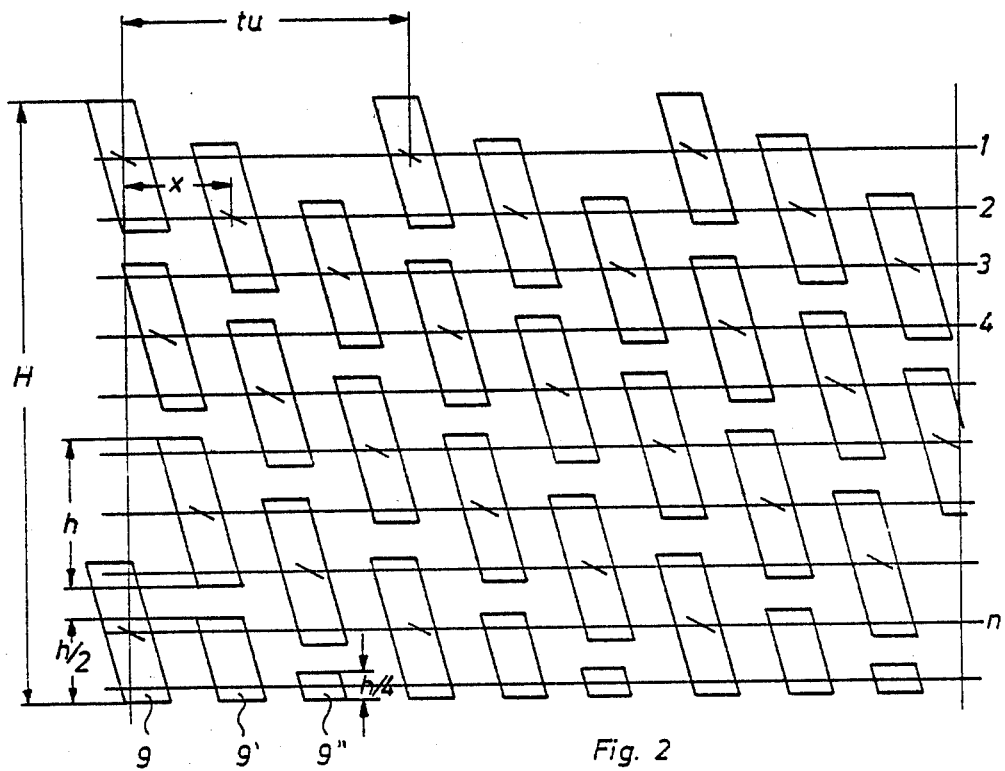
FIG. 2 is an enlarged detail of a development of the drum with the part-blades.

As can be seen particularly clearly in the developed view shown in FIG. 2, in the lower region, i.e. in the region of the outlet 3, intermediate blades 9' and 9" with the heights 0.5 h and 0.25 h respectively are provided on the drum 7, between the normal length or full size blades 9.

Thus along a height level of, for example, the center line of row number 2, part-blades from rows numbered 1, 2 and 3 pass by the strainer basket.

As can be seen, this means that, apart from the inlet region, a uniform blade arrangement pattern is produced. Naturally, it is also possible within the scope of the invention to provide intermediate blades with 0.5 h or 0.25 h on the drum 7 in the vicinity of the inlet 2.

From the foregoing it is now apparent that a novel separator arrangement for cleaning suspensions has been disclosed meeting the objects and advantageous features set out hereinbefore as well as others and that modifications as to the precise configurations, shapes and details may be made by those having ordinary skill in the art without departing from the spirit of the invention or the scope thereof as set out by the claims which follow.

What is claimed is:

1. A separator for cleaning suspensions, particularly fibrous suspensions, with a strainer through which the suspension flows, and with a housing which encloses the strainer, the housing having an inlet for the suspension to be cleaned and outlets both for the cleaned suspension and for the impurities held back by the strainer, and with blades revolving in front of the strainer which are divided into part-blades along the axis of rotation and are offset relative to each other in the circumferential direction the strainer being generally symmetric about the axis of rotation, the improvement wherein several rows of part-blades are arranged within the strainer of such a length and staggered over the circumference in such a way that substantially at every height level, relative to the height of the strainer, part-blades from several rows pass by the strainer and wherein in the vicinity of the outlet for the cleansed suspension, shorter part-blades are circumferentially arranged between the part-blades of normal length.

2. A separator according to claim 1 wherein the rows of blades are arranged so that substantially the same number of part-blades passes by the strainer basket at every height level.

3. A separator according to claim 1 wherein the part-blades are arranged on a rotating drum, with spacers affixing the part-blades to the drum.

4. A separator according to claim 1 wherein the rows of part-blades are arranged in a manner that $$0.4 \leq x/t_u \leq 0.25,$$

where x = the distance between two vicinal blades of two sequent rows, and $t_u$ = the distance between the blades in a row.

5. A separator according to claim 4 wherein the number and height of blades and the height of the strainer basket are related by the equation $$Z \times h = (4 \text{ to } 8) \times H,$$

where

Z = the number of part blades,

H = the height of the strainer basket, and h = the height of the part-blades.

6. A separator for cleaning suspensions, particularly fibrous suspensions, with a strainer through which the suspension flows, and with a housing which encloses the strainer, the housing having an inlet for the suspension to be cleaned and outlets both for the cleaned suspension and for the impurities held back by the strainer, and with blades revolving in front of the strainer which are divided into part-blades by planes perpendicular to the axis of rotation and which blades are offset relative to each other in the circumferential direction, the strainer being generally symmetric about the axis of rotation, the improvement wherein several rows of part-blades are arranged within the strainer with the part-blades in the intermediate rows being of a substantially uniform height while the part-blades in the lowermost row are of at least two different heights with adjacent part-blades in that lowermost row being of different heights and wherein adjacent blades in the lowermost row are respectively of the uniform height, about half the uniform height, and about one-fourth the uniform height.

7. A separator according to claim 6 wherein the rows of blades are arranged so that substantially the same number of part-blades passes by the strainer at every height level.

8. A separator according to claim 6 wherein the part-blades are arranged in a manner that $$0.4 \leq x/t_u \leq 0.25,$$

where x = the distance between two vicinal blades of two sequent rows, and $t_u$ = the distance between the blades in a row.

* * * * *